May 21, 1957     C. HIRSCH     2,792,744
METHOD OF COMPARING COLORS IN PRINTING AND COLOR
CONTRAST LENSES USED IN SAME
Filed Feb. 26, 1954

INVENTOR.
CARL HIRSCH
BY
ATTORNEY.

United States Patent Office 2,792,744
Patented May 21, 1957

2,792,744

METHOD OF COMPARING COLORS IN PRINTING AND COLOR CONTRAST LENSES USED IN SAME

Carl Hirsch, Philadelphia, Pa.

Application February 26, 1954, Serial No. 412,767

1 Claim. (Cl. 88—14)

The present invention relates to color printing and is concerned primarily with a method and color contrast lenses for examining work and comparing it with the master proof that is furnished by the engraver.

At the present time the colors which are most widely used in color printing are yellow, red, blue and brown. Under conditions of work usage there are upwards of fifty shades of red. There is about the same number of shades of blue, while there are in the neighborhood of twelve shades of yellow employed. When a printer compares his proofs against the master that is supplied by the engraver, considerable difficulty is experienced in determining whether or not exactly the right shade of ink is being used. He also has considerable difficulty in detecting imperfections and defects, particularly in those cases where there is no marked contrast between the background and the particular color being printed.

Summing up the present-day conditions it is noted that very often three to four hours of the printer's time is consumed in the comparative examination of his proofs. This, of course, is an item of considerable expense to the printing contractor.

With the foregoing conditions in mind, the present invention has in view as its foremost objective the provision of a method of examining proofs in color printing and comparing the printer's proofs with the engraver's proofs and which method is characterized by the use of a viewing device which consists essentially of colored lenses with the color of the lenses being the complement of the particular color that is printed.

When the color printing is viewed through these lenses, the color thereof is neutralized so that the printed matter stands out from the background and any defects or imperfections are immediately brought to the attention of the workman. Moreover, he can readily determine whether or not the correct shade of printing ink is being employed as determined by the engraver's proof.

It is intended that the process color contrast lenses of this invention be sold to the owners of print shops. Such owners will supply their printers with the lenses. Hence, it is important that these lenses be cheaply manufactured as they must be supplied in very large numbers and will have to be replaced from time to time. With this condition in mind, a further object of this invention is to provide a pair of process color contrast lenses of a highly simplified construction that are made from cheap materials. The present invention has particularly in mind the use of a frame that may be made of paper, cardboard, or fiber and which carries the colored lenses which may be made of gelatin, cellophane, acetate or any transparent plastic.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a process or method for the comparative testing of color printing, together with the color contrast lenses that are used in such a method.

For a full and more complete understanding of the invention, reference may be had to the following description and accompanying drawing wherein.

Figure 1:
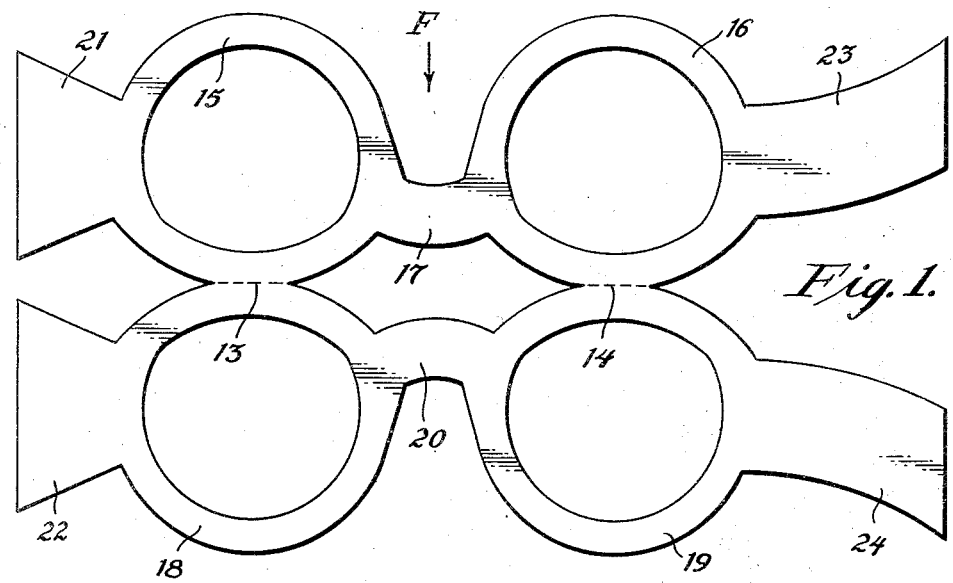
Figure 1 is a top plan view of a cardboard frame in opened-out position.

Before referring to the drawing, it will be noted that a yellow background that is used in color printing will find its complement in blue lenses. Likewise, a red background finds its complement in green lenses, a blue background in red lenses and a brown background in a lens of light green. When any color printing involving the backgrounds above specified is examined by a lens of complementary color, the color is of course neutralized and the work stands out so that it may be easily scrutinized and examined. The present invention provides color contrast lenses for carrying out this process of examination.

Figure 2:
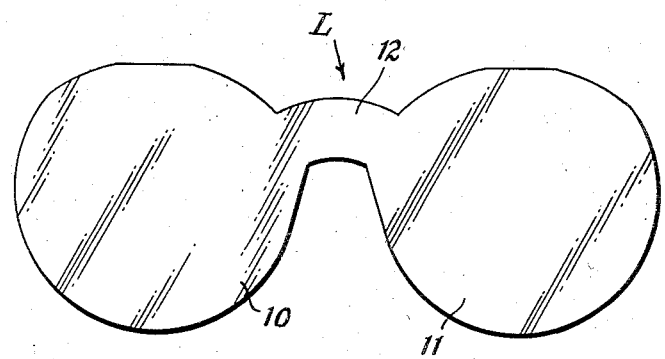
Figure 2 is a similar view of a set of colored lenses per se.

Referring now to the drawing and first more particularly to Figure 2, a pair of lenses are therein illustrated and referred to in their entirety by the reference character L. A pair of lenses L is made up of the individual lenses 10 and 11 which are integrally joined by a nose bridge 12. The lenses L may be made from any of a wide variety of materials. Among such materials might be noted gelatin, cellophane, acetate or any of the transparent plastics. The important and essential property of the lenses L is that they be susceptible of being properly colored.

Referring now more particularly to Figure 1, a cardboard frame F is therein illustrated in an opened-out position. The frame F comprises two complemental halves which are joined along the hinge lines 13 and 14. Thus, one-half of the frame F is made up of the circular parts 15 and 16 that are joined by a nose bridge 17, while the other part is made up of the ring-like portions 18 and 19 that are joined by the nose bridge 20. It will be noted that the hinge line 13 is at the joinder of the rings 15 and 18, while the hinge line 14 is at the joinder of the rings 16 and 19. From the outer side of the rings 15 and 18 extend tabs 21 and 22 while handle tabs 23 and 24 extend outwardly from the rings 16 and 19.

The colored lens L is positioned between the two halves of the frame F and the latter folded over into a closed position in which the rings 15 and 16 are superimposed over the rings 18 and 19, sandwiching the lens L therebetween. Any appropriate adhesive may be used to secure the lens in position. The tabs 21 and 22 coincide and any appropriate fastening means, such as a staple, may be employed in securing these elements together. Likewise, the handle tabs 23 and 24 are superimposed and may be secured together in any preferred manner.

Figure 3:
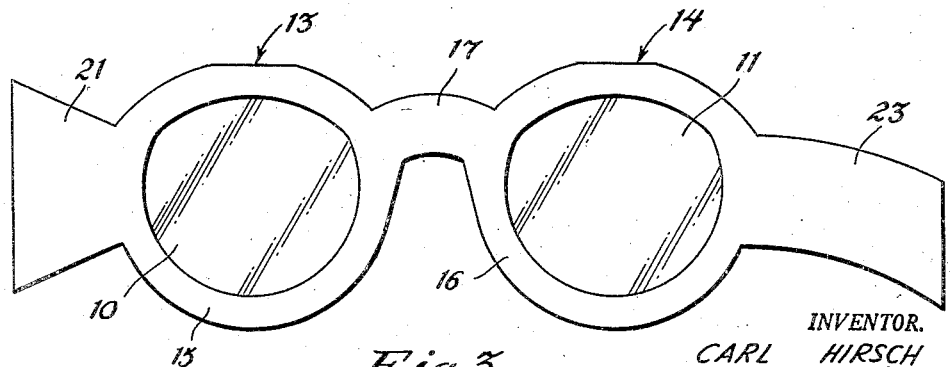
Figure 3 is a view of the assembled device.

The complete process color contrast lenses are illustrated in Figure 3, wherein it will be noted that the lenses 10 and 11 are clamped between the respective rings with the tabs 21 extending from one side of the device and the handle tabs 23 from the other.

The frame F may be made from any cheap material such as paper, cardboard or fiber.

While the method of using the process color contrast lenses of this invention is believed to be obvious from the foregoing, it may be briefly outlined as follows.

A printer receives a proof of the color printing from the engraver. He will have on hand a large number of differently colored contrast lenses. From this supply he will select the proper complement to the color on the engraver's proof. After he strikes off his own proofs he may examine his work by using the properly selected contrast lenses. Thus, he is enabled to carry out the comparative examination in about ten or fifteen percent of the time previously required.

While a preferred specific embodiment of the invention is hereinbefore set forth, it is to be clearly understood that the invention is not to be limited to the exact steps, materials and designs illustrated and described because various modifications of these details may be provided in putting the invention into practice within the purview of the appended claim.

What is claimed is:

In the comparative examination of color printing, the method comprising the steps of: (a) selecting from a set of graded filters a filter which will eliminate color from a colored master and reduce said master to black and white, the selecting operation being carried out by repeatedly interposing different filters from said set between said master and the eyes of an operator until a filter which will eliminate the color of said master is identified, and then (b) interposing said selected filter between the eyes of said operator and reproductions of said master whereby any defects in said reproduction may be more easily detected.

References Cited in the file of this patent

UNITED STATES PATENTS

| | | |
|---|---|---|
| 544,666 | Duhauron | Aug. 20, 1895 |
| 1,422,527 | Berger | July 11, 1922 |
| 1,968,193 | Einson | July 31, 1934 |
| 2,032,139 | Macy | Feb. 25, 1936 |
| 2,135,197 | Norling | Nov. 1, 1938 |